Patented May 11, 1926.

1,584,156

UNITED STATES PATENT OFFICE.

WERNER URSUM, LUDWIG SCHÜTZ, AND LUDWIG TAUB, OF ELBERFELD, GERMANY, ASSIGNORS, BY MESNE ASSIGNMENTS, TO WINTHROP CHEMICAL COMPANY, INC., OF NEW YORK, N. Y., A CORPORATION OF NEW YORK.

BARBITURIC ACID DERIVATIVE.

No Drawing.   Application filed December 17, 1924.   Serial No. 756,547.

The present invention relates to the manufacture and production of the hitherto unknown barbituric acid derivatives having most probably the formula:

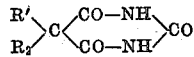

wherein R' stands for monochlorocrotyl and R$_2$ stands for monochlorocrotyl or another unsaturated or saturated substituent. The new products have proved to be valuable hypnotics, an average dose being from ¼ to ½ grams. They are free of noxious secondary effects and have no narcotic action. The solution of their alkali metal salts do not alter and show no irritating action.

The process for producing the new products consists in converting malonic or cyanoacetic acid or their monosubstituted derivatives (alkyl-, aryl- or aralkyl derivatives) into the corresponding disubstituted derivatives by treatment with saturated or unsaturated halogenated alkylhalides and converting the resulting products into the barbituric acid derivatives by the methods known in the arts e. g. by condensation with urea. The second substituent can also be introduced after the formation of the barbituric acid derivatives.

In order to illustrate our new process more fully the following example is given the parts being by weight:

50 parts of mono-ethylmalonic acid diethyl ester are mixed together with 50 parts of monochlorocrotylbromide. A solution of 6.2 parts of sodium in 100 parts of absolute alcohol is then added while stirring. The mixture is heated in a vessel provided with a reflux condenser until it is neutral, the alcohol is distilled off, the residue is poured on ice, washed with water and distilled over. The monochlorocrotyl-ethyl malonic ester boils at 154–157° C. under a pressure of 18 mm.

Subsequently 100 parts of this product is mixed with a solution prepared from 32.5 parts of urea in an alcoholic solution of sodium ethylate (prepared from 20.8 parts of sodium and 330 parts of absolute alcohol). The mixture is heated to boiling for several hours in a vessel provided with a reflux condenser, the mixture is poured into water and acidified. The C-C-mono-chlorocrotylethyl barbituric acid

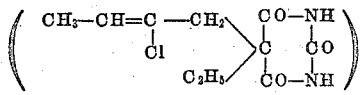

precipitates. It is purified by a crystallization from water. It melts at 162° C.

The C-C-dichlorocrotylbarbituric acid

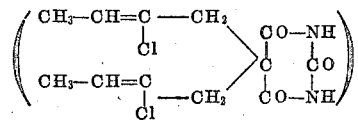

melts at 210–212° C, the mono-chlorocrotyl-phenylbarbituric acid

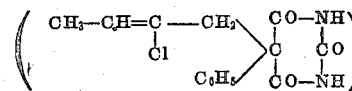

at 240–242° C.

We claim:
1. The herein described barbituric acid derivatives having most probably the following general formula:

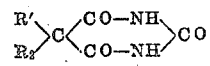

wherein R' stands for monochlorocrotyl and R$_2$ stands for monochlorocrotyl or another unsaturated or saturated substituent said derivatives being generally whitish substances, forming salts with alkali metals, and being valuable hypnotics, substantially as described.

2. The herein described mono-chlorocrotyl-ethyl barbituric acid being whitish crystals soluble with difficulty in water, melting at 162° C., and being a valuable hypnotic, substantially as described.

In testimony whereof we have hereunto set our hands.

WERNER URSUM.
LUDWIG SCHÜTZ.
LUDWIG TAUB.